US008220720B2

(12) United States Patent
Auweder et al.

(10) Patent No.: US 8,220,720 B2
(45) Date of Patent: Jul. 17, 2012

(54) THERMOSTATIC VALVE FOR COOLING SYSTEM OF AN INTERNAL COMBUSTION ENGINE

(75) Inventors: Andreas Auweder, Vaihingen/Enz (DE); Eike Willers, Stuttgart (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 854 days.

(21) Appl. No.: 12/227,564

(22) PCT Filed: May 18, 2007

(86) PCT No.: PCT/EP2007/004453
§ 371 (c)(1),
(2), (4) Date: Nov. 21, 2008

(87) PCT Pub. No.: WO2007/134807
PCT Pub. Date: Nov. 29, 2007

(65) Prior Publication Data
US 2009/0165735 A1 Jul. 2, 2009

(30) Foreign Application Priority Data
May 23, 2006 (DE) .......................... 10 2006 025 065

(51) Int. Cl.
*F01P 7/16* (2006.01)
(52) U.S. Cl. .................. 236/34.5; 236/93 A; 236/93 R; 236/99 K; 236/99 J; 236/100; 123/41.09
(58) Field of Classification Search ................. 236/34.5, 236/93 A, 93 R, 99 K, 99 J, 100; 123/41.09; 137/601.2
See application file for complete search history.

(56) References Cited

U.S. PATENT DOCUMENTS

| 5,238,185 | A | * | 8/1993 | Saur et al. ..................... 236/34.5 |
| 5,289,803 | A | | 3/1994 | Matsushiro et al. |
| 5,494,005 | A | * | 2/1996 | Saur ............................ 123/41.1 |
| 5,979,778 | A | * | 11/1999 | Saur ............................ 236/34.5 |
| 6,792,925 | B2 | * | 9/2004 | Dworatzek et al. ........... 123/573 |
| 2003/0177985 | A1 | | 9/2003 | Engelin et al. ................ 123/41.1 |
| 2005/0268866 | A1 | | 12/2005 | Finkbeiner et al. .......... 123/41.1 |

FOREIGN PATENT DOCUMENTS

| DE | 27 55 462 | | 5/1979 |
| DE | 102 06 359 | A1 | 9/2003 |
| GB | 2 281 613 | A | 8/1995 |
| JP | 5141241 | A | 6/1993 |
| JP | 8189361 | A | 7/1996 |
| WO | WO 2004/046516 | A1 | 6/2004 |

OTHER PUBLICATIONS

International Preliminary Report on Patentability, Jan. 20, 2009.
Examination Report from Japanese Patent Office in regards to Japanese Patent Application 2009-511391, May 6, 2011.

* cited by examiner

*Primary Examiner* — Cheryl J Tyler
*Assistant Examiner* — Jonathan Bradford
(74) *Attorney, Agent, or Firm* — K&L Gates LLP

(57) ABSTRACT

A thermostatic valve for a cooling system in an internal combustion engine. The valve includes a common short-circuit element (21) having a short circuit valve gate (26) and a short circuit valve disc (25) and is arranged upstream in the extending direction of the thermostatic working element (16). A common valve seat is provided, wherein an overpressure valve (32) opening into the mixing chamber (15) is provided in the common valve seat.

8 Claims, 4 Drawing Sheets ated between it and the upper valve part 10. A common short-circuit valve element 25, comprising a short-circuit valve slide 26 and a short-circuit valve plate 27, is associated with the short-circuit valve element 21.

THERMOSTATIC VALVE FOR COOLING SYSTEM OF AN INTERNAL COMBUSTION ENGINE

CROSS-REFERENCE TO RELATED APPLICATIONS

This application claims the benefit of German patent application 10 2006 025 065.6, filed May 23, 2006, herein incorporated by reference.

FIELD OF THE INVENTION

The invention relates to a thermostatic valve for a cooling system of an internal combustion engine, having a thermostatic work element to be disposed in a mixing chamber, which work element acts as a drive element for a main valve element to be disposed between the mixing chamber and a connection from a coolant radiator and as a drive element for two short-circuit valve elements which are to be disposed upstream of the mixing chamber and are disposed relative to a valve seat such that upon an extension motion of the thermostatic work element, the initially closed first short-circuit valve element opens and the other closes upon a further extension motion.

BACKGROUND OF THE INVENTION

A known thermostatic valve of the above type (German Patent Disclosure De 2755462 B1, FIGS. 5-8) is used for engine inlet regulation. As short-circuit valve elements, it has two short-circuit valve plates, between which a valve seat is disposed. The two short-circuit valve plates are displaceable on a bolt and are loaded by compensation springs. In the cold state, one short-circuit valve plate closes the communication between the mixing chamber and the engine outlet, so that the engine warms up faster. When the thermostatic work element is extended because of the warming of the coolant, this valve plate opens, while the other short-circuit valve plate gradually closes in accordance with the extension motion of the short-circuit valve.

SUMMARY OF THE INVENTION

It is the object of the invention to structurally simplify the thermostatic valve of the type defined at the outset and moreover to enhance its functional reliability.

This object is attained in that a common short-circuit valve element is provided which has a portion acting as a short-circuit valve slide and a short-circuit valve plate located upstream in the extension direction, of the thermostatic work element, between which a common valve seat is provided; and that in the common valve seat, an overpressure valve that opens toward the mixing chamber is provided.

By means of the common short-circuit valve element, the number of components can be reduced. Since one of the valve elements is embodied as a short-circuit valve slide, one spring can be dispensed with. It is moreover assured that whenever the engine rpm is elevated in the cold state, the thermal and/or mechanical damage to the internal combustion engine or its components ensues. It is for this purpose that the overpressure valve is provided, which at an elevated pressure opens the flow of the coolant from the engine outlet to the engine inlet.

In one feature of the invention, it is provided that the common valve seat is formed by an annular component, which has a portion that is insertable in sealing fashion into an engine block or a cylinder head, and a radially inward-protruding annular rib, the inner edge of which acts as a valve seat for the short-circuit valve slide and as a valve seat for the short-circuit valve plate. It is thereby possible to embody the thermostatic valve as a prefabricated component, without having to contemplate machining operations on the internal combustion engine especially for the short-circuit valve, for instance for a support face for a spring. In a further feature of the invention, it is provided that the annular rib of the component is provided with openings, which are covered on the side of the mixing chamber with an overpressure valve ring that is loaded by an overpressure valve spring.

In a further feature of the invention, it is provided that the overpressure valve spring is braced on the common short-circuit valve element. It is thereby possible to assign the overpressure valve an additional function, namely the function of a supplementary restoring spring, which is required when an idle distance is provided between the thermostatic work element and the main valve element.

BRIEF DESCRIPTION OF THE DRAWINGS

Further characteristics and advantages of the invention will become apparent from the ensuing description of the exemplary embodiment shown in the drawings.

DETAILED DESCRIPTION OF THE PREFERRED EMBODIMENTS

Figure 1:
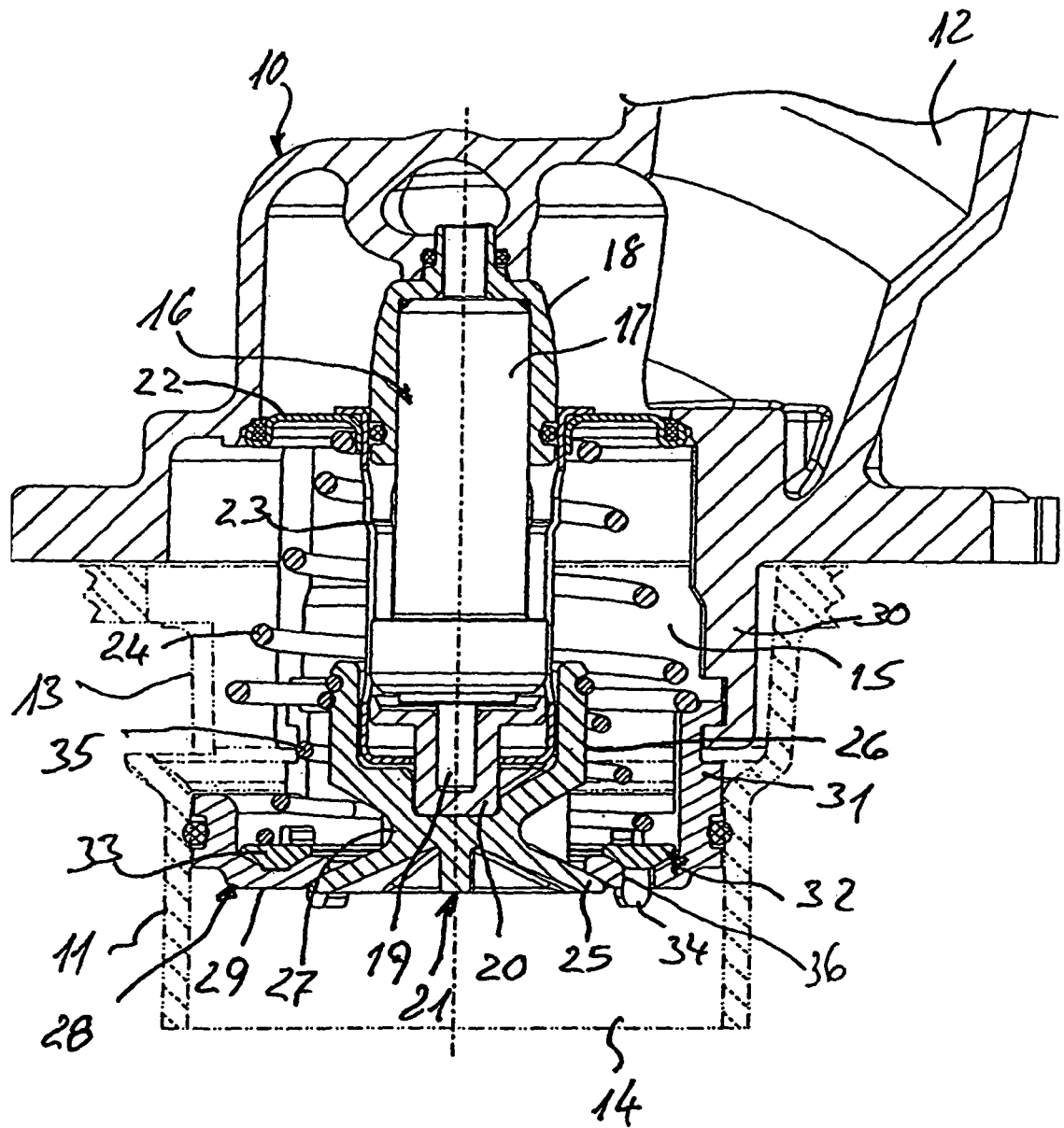
FIG. 1 shows an axial section through a thermostatic valve of the invention in the "cold" state.
Figure 2:
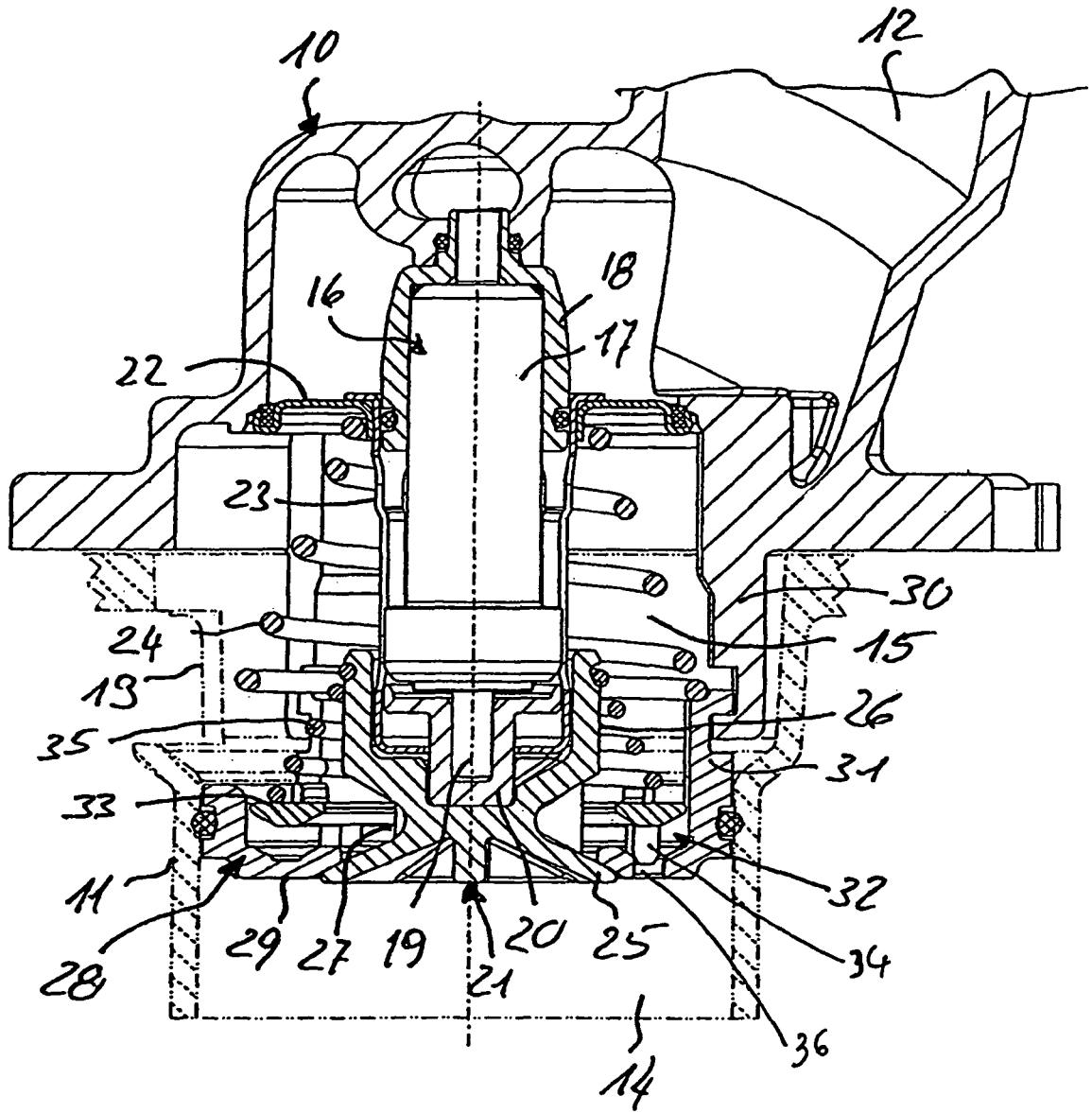
FIG. 2 shows the axial section through the thermostatic valve when the overpressure valve has responded.

The thermostatic valve shown in FIGS. 1-4 has a lidlike upper valve part 10, which is mounted on an engine block 11 or cylinder head indicated by dot-dash lines. The upper valve part 10 has a connection 12, which leads to a coolant radiator, not shown. The engine block 11 or cylinder head has an opening 13, which acts as an engine inlet, and an opening 14, which communicates with the engine outlet (short-circuit circulation).

Between the opening 14 for the engine outlet and the opening 13 for the engine inlet, a mixing chamber 15 is provided, into which a thermostatic work element 16 protrudes. The housing 17 of the thermostatic work element 16 is braced by the interposition of a plastic cap 18 in the upper valve part 10. If the upper valve part 10 is made from plastic, then the plastic cap 18 can be integrated with the upper valve part. An expandable material, in particular a wax mixture, which changes its volume as a function of temperature is disposed in the housing 17 of the thermostatic work element 16. Upon an increase in its volume, a work piston 19 is driven out of the housing 17 of the thermostatic work element 16. Upon its extension motion, via a hat-shaped transmission part 20, the work piston 19 slaves first a short-circuit valve element 21 and then a main valve plate 22 to its own motion. A valve seat of the upper valve part 10 is associated with the main valve plate 22. The main valve plate 22 has a cagelike middle part 23, which embraces the thermostatic work element 16 and whose bottom is associated with the transmission part 20. A restoring spring or closing spring 24 is associated with the main valve plate 22.

Figure 3:
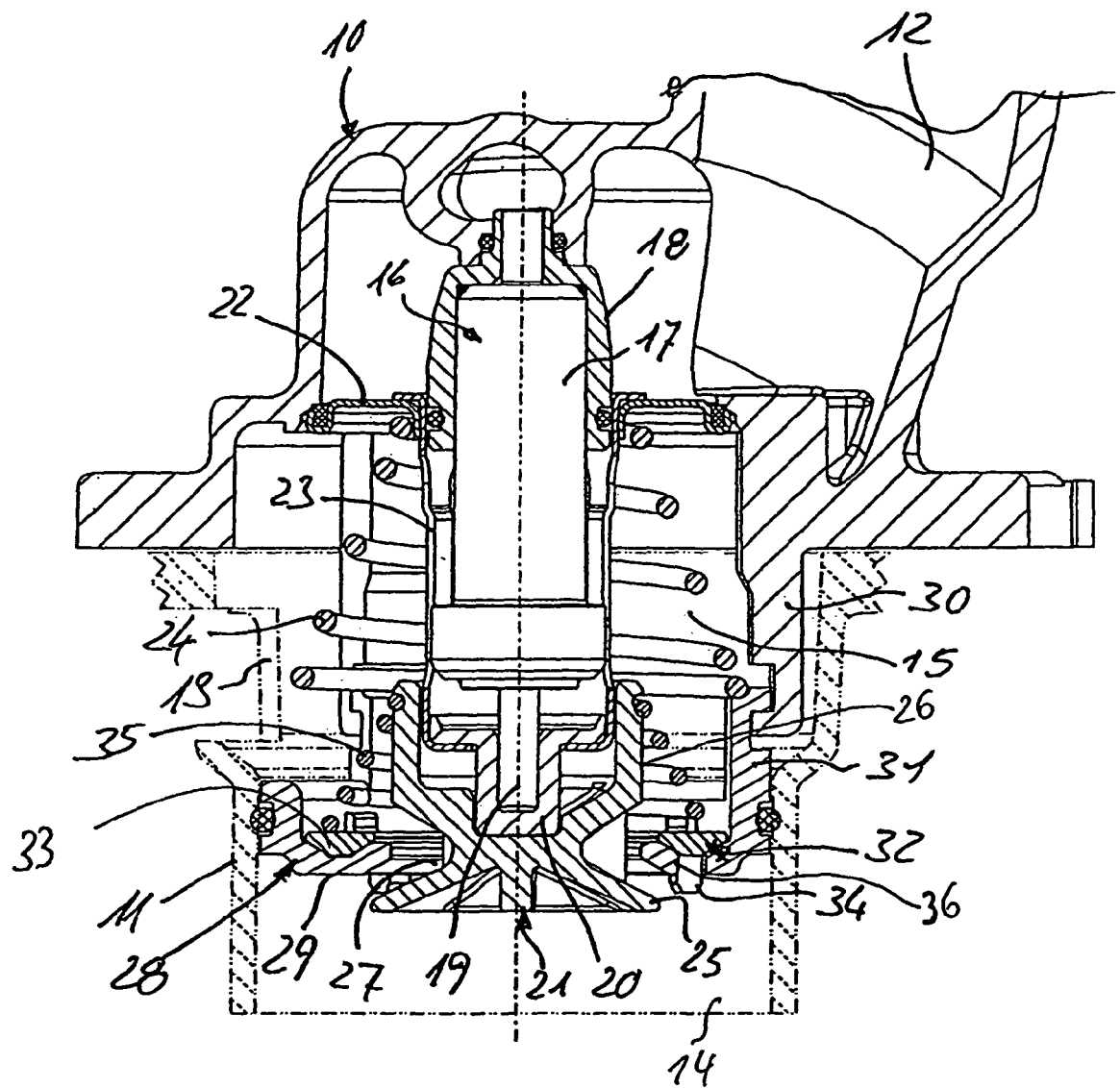
FIG. 3 shows the axial section through the thermostatic valve during the extension motion of the thermostatic work element.

The short-circuit valve element 21 has a short-circuit valve plate 25 and a portion that acts as a short-circuit valve slide 26. The short-circuit valve plate 25 and the short-circuit valve slide 26 are spaced apart from one another in the extension direction of the thermostatic work element 16. Between them is an annular groovelike recess 27, in the region of which the short-circuit valve element 21 is provided with reinforcing ribs, which also serve the purpose of axial guidance when the short-circuit valve element 21 is in an open position (FIG. 3).

Between the short-circuit valve plate 25 and the short-circuit valve slide 26 is an annular component 28, which is inserted in sealing fashion by a cylindrical portion into the engine block or cylinder head 11. The annular component 28 further has an inward-protruding annular rib 29, which acts as a valve seat for the short-circuit valve plate 26 and also as a valve slide seat for the short-circuit valve slide 26 of the short-circuit valve element 21. The restoring spring or closing spring 24 is braced on the annular component 28. The annular component 28 is retained on the upper valve part 10. The upper valve part 10 is equipped with a plurality of prongs 30, preferably three of them, from which the annular component 28 is suspended by similar prongs 31.

An overpressure valve 32 is integrated with the annular component 28. To that end, the annular rib 29 of the annular component 28 is provided with a plurality of openings 36, which are covered by means of an overpressure valve ring 33. The overpressure valve ring 33 is provided with a plurality of pawls 34, which protrude into the openings 36 in the annular rib 29 and serve to guide the overpressure valve ring 33. The overpressure valve ring 33 is loaded by an overpressure valve spring 35. This overpressure valve ring 35 is braced on the short-circuit valve element 21. In the exemplary embodiment, it has latched into an annular groove of the short-circuit valve element 21.

The hat-shaped transmission part 20, which is slipped onto the work piston 19, penetrates the bottom of the middle part 23 of the main valve plate 22 and engages an internal recess in the short-circuit valve element 21. Between the flangelike part of the transmission part 20 and the bottom of the middle part 23 of the main valve plate 22, a spacing is provided, which dictates an idle distance over which the thermostatic work element 16 in an extension motion slaves initially only the short-circuit valve element 21 to its motion and then, only after the idle distance has been traversed, the main valve plate 22 as well. The overpressure valve spring 35 is embodied such that it also acts as a restoring spring, which causes the work piston 19 to be restored by the short-circuit valve element 21 to its outset position, or in other words, to the position in FIG. 1.

When the internal combustion engine is cold, the communication from the radiator to the mixing chamber 15 via the connection 12 is closed by the main valve plate 22. The communication from the connection 14 of the engine outlet to the mixing chamber 15 is closed as well. Thus a flow of coolant is largely suppressed, except for leakage flows, so that a rapid warmup of the engine and coolant ensues.

Figure 4:
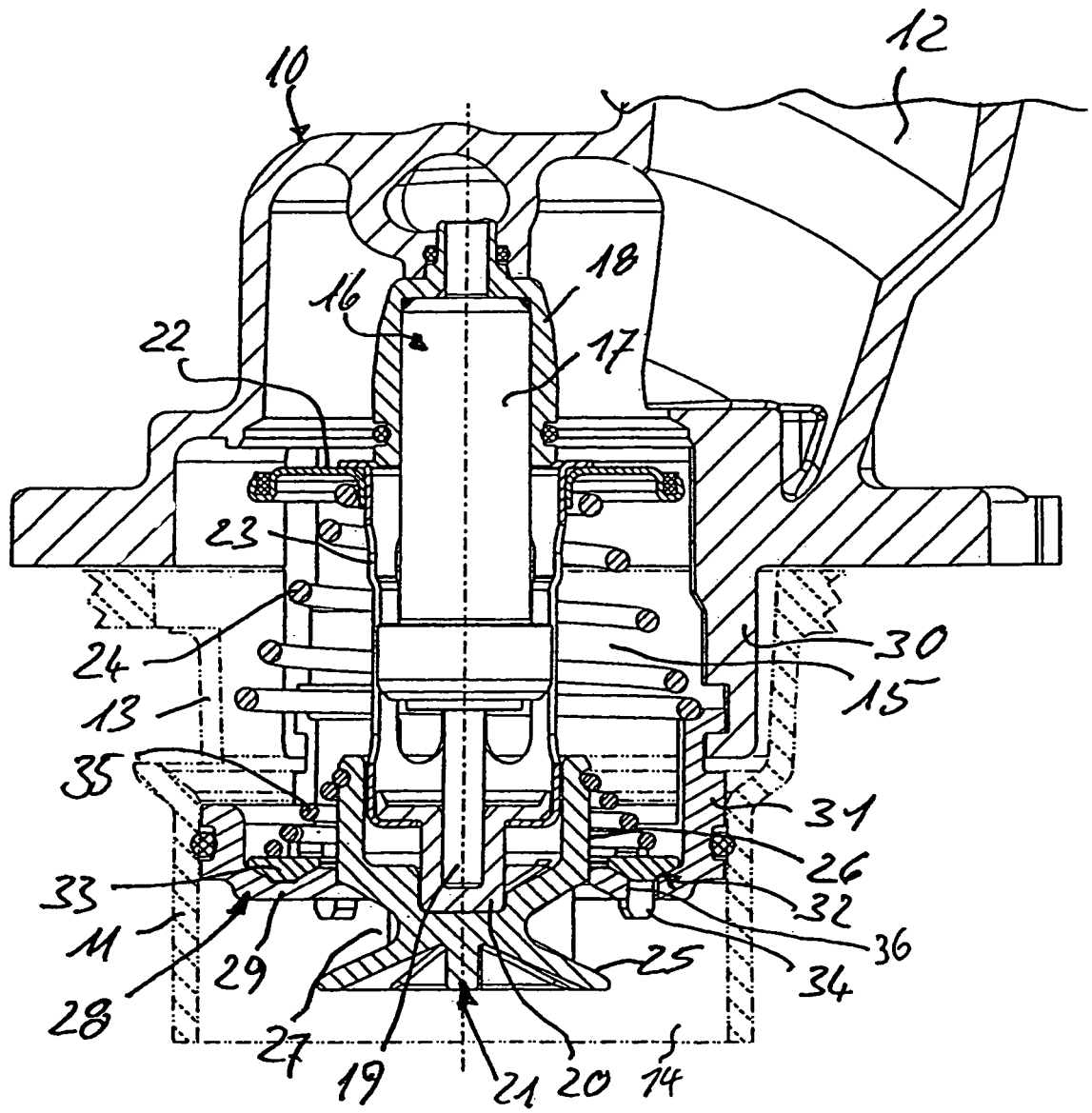
FIG. 4 shows the axial section through the thermostatic valve when the thermostatic work element is extended.

If when the engine is cold and hence the radiator is cold as well, the engine is operated at elevated rpm, an overpressure occurs in the region of the connection 14 of the engine outlet. This overpressure causes the overpressure valve 32 to open; that is, the overpressure valve ring 33 lifts from the annular rib 29, counter to the action of the overpressure valve spring 35, and uncovers the openings 36. The result is a flow of coolant from the connection 14 of the engine outlet to the connection 13 of the engine inlet, so that thermal and/or mechanical overloads on the engine, or components connected to it, are avoided. When the coolant temperature matches the response temperature of the thermostatic work element 16, the latter's work piston 16 is extended. This work piston 19 initially slaves only the short-circuit valve element 21, as is shown in FIG. 3. In the process, the short-circuit valve element 21 moves relative to the middle part 23 of the main valve plate 22. Once the transmission part 20 has moved far enough that the idle distance to the bottom of the middle part 23 has been spanned, then in addition to the short-circuit valve, the main valve is opened as well; that is, the main valve plate 22 is lifted from the valve seat of the upper valve part 10, as is shown in FIG. 4. After a certain distance, the short-circuit valve slide 26 of the short-circuit valve element 21 then closes the short-circuit valve, i.e., when it reaches the region of the valve seat formed by the annular rib 29.

In the exemplary embodiment shown, an electrically heatable thermostatic work element 16 is provided. In the interior of the stationary housing 17, there is an electric heating element, to which electrical energy is supplied, in a manner not shown in further detail, through the bottom of the housing 17. In a modified embodiment, it is provided that the thermostatic work element 16 is not electrically heatable.

In another modified embodiment, it is provided that the thermostatic work element 16 is disposed rotated by 180°; that is, the work piston 19 is braced in stationary fashion, for instance on the upper valve part 10, so that upon warming with an ensuing extension motion of the work piston 19, the housing 17 is slaved. In that case, the main valve plate 22 and the short-circuit valve element 21 are mounted on the housing 17 of the thermostatic work element 16.

When the short-circuit valve slide 26 of the short-circuit valve element 21 is closed and the main valve plate 22 is open, it is possible, if the differential pressure between the connection 14 and the mixing chamber 15 is too high, for the overpressure valve ring 33 to be opened counter to the overpressure spring 35 and for the overpressure to be reduced.

It is readily possible for the thermostatic valve shown in FIGS. 1-4 to be used for engine outlet regulation as well. In that case, the connection 13 would be provided for the engine outlet, the connection 14 would be provided for the engine inlet, and the connection 12 would be provided for a communication with a coolant radiator. In that case, the overpressure valve 32 is nonfunctional, since at an elevated engine rpm with a cold engine, an overpressure would arise inside the mixing chamber 15 acting as a distributor chamber. However, then the short-circuit valve plate 25 of the short-circuit valve element 21 can cooperate with the short-circuit valve spring 35 as an overpressure valve. If the thermostatic valve is used for engine outlet regulation and there is an overpressure in the mixing chamber 15 acting as a distributor chamber, the position shown in FIG. 3 would result. Since in the use for engine outlet regulation the overpressure valve ring 33 is superfluous, it is expedient to omit the overpressure valve ring 33 and to provide an annular component 28 that has a closed annular rib 29. The overpressure spring 35 is then braced directly on the annular component 28.

In a modified embodiment, the thermostatic valve is embodied as a so-called housing thermostat. This thermostat has a two-part or multi-part housing, in which all the elements are accommodated and which is provided with hose connections for the engine outlet, the coolant radiator, and the engine inlet.

What is claimed is:

1. A thermostatic valve for a cooling system of an internal combustion engine, having a thermostatic work element (16) disposed in a mixing chamber (15), which work element operates as a drive element for a main valve element (22, 23) disposed between the mixing chamber (14) and a connection from a coolant radiator and as a drive element for two short-circuit valve elements which are disposed upstream of the mixing chamber (15) and are disposed relative to a common valve seat such that upon an extension motion of the thermostatic work element (16), the initially closed first short-circuit valve element opens and the other closes upon a further extension motion, characterized in that a common short-circuit valve element (21) is provided, which has a portion acting as a short-circuit valve slide (26) and a short-circuit valve plate (25) located upstream in the extension direction, of the thermostatic work element (33), between which the common valve seat is provided; and that in the common valve seat, an overpressure valve (32) that opens toward the mixing chamber (15) is provided.

2. The thermostatic valve as defined by claim 1, characterized in that the common valve seat is formed by an annular component (28), which has a portion that is insertable in sealing fashion into an engine block (11) or a cylinder head, and a radially inward-protruding annular rib (29), the inner edge of which operates as a valve seat for the short-circuit valve slide (26) and as a valve seat for the short-circuit valve plate (25).

3. The thermostatic valve as defined by claim 2, characterized in that the annular rib (29) of the annular component (28) is provided with openings (36), which are covered on the side of the mixing chamber (15) with an overpressure valve ring (33) that is loaded by an overpressure valve spring (35).

4. The thermostatic valve as defined by claim 1, characterized in that an overpressure valve spring (35) is braced on the common short-circuit valve element (21).

5. The thermostatic valve as defined by claim 1, characterized in that an annular component (28) is mounted on an upper valve part (10) and operates as an abutment for a restoring spring or closing spring (24) that loads the main valve element (22, 23).

6. The thermostatic valve as defined by claim 1, characterized in that between the thermostatic work element (16) and the main valve element (22, 23), an idle travel path is provided.

7. The thermostatic valve as defined by claim 1, characterized in that between the short-circuit valve slide (26) and the short-circuit valve plate (25) of the common short-circuit valve element (21), in the extension motion of the thermostatic work element (16), an open region is left.

8. The thermostatic valve as defined by claim 7, wherein the open region is in the shape of an annular groovelike recess.

* * * * *